March 18, 1952 R. E. MERCIER 2,589,952
CONSTRUCTIONAL TOY ELEMENT
Filed March 7, 1946
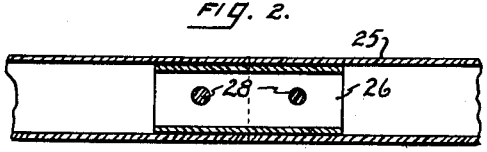
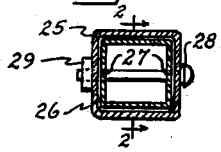
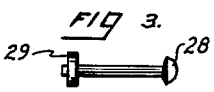
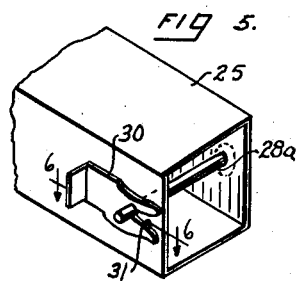
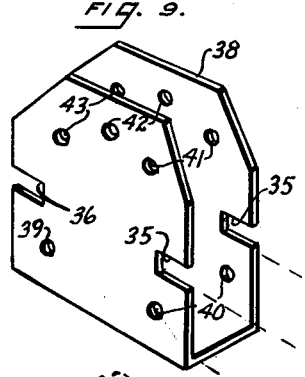
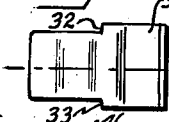
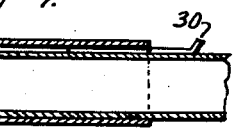
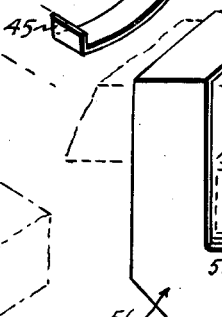
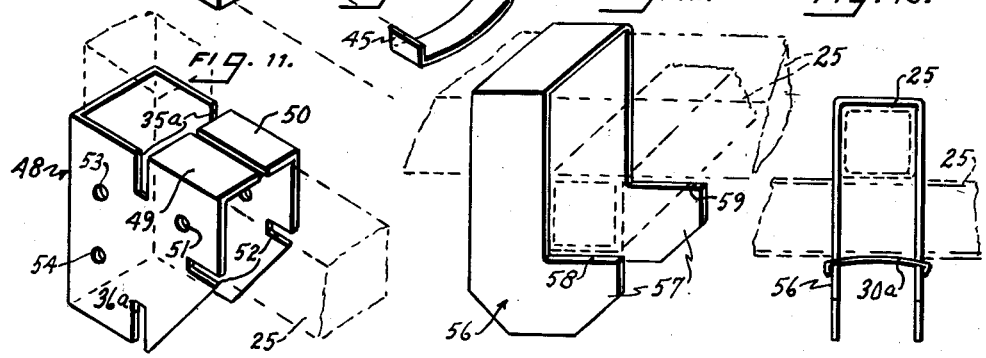
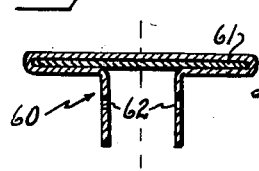
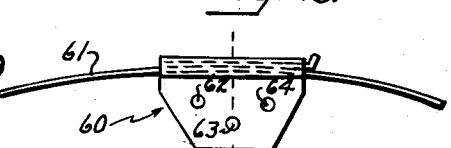
INVENTOR
ROBERT ERNEST MERCIER
BY Howard J. Jeandron
ATTORNEY Patented Mar. 18, 1952

2,589,952

UNITED STATES PATENT OFFICE 2,589,952

CONSTRUCTIONAL TOY ELEMENT

Robert Ernest Mercier, Paris, France

Application March 7, 1946, Serial No. 652,573

2 Claims. (Cl. 46—23)

The present invention relates to improvements in structural elements or devices for use in erecting toy bridges, buildings, structures, or the like.

The invention consists in structural elements or devices for use in erecting model bridge structures, or building structures, or the like in which holes are provided in the end of each telescoping element and in the supporting or joining elements so that a pin may be passed through said holes to hold two or more elements in juxtaposition. To insure the pin remaining in a fixed position a rubber grommet may be used on the end of the pin as a retainer. The main structural elements are comprised of tube shaped members and further are formed to telescope one within the other. A spring clip is provided to be fitted between the two telescoping members generally at the end of one for easy access, to cause a frictional binding action with both members and thus fix one tube with relation to the other. This combination permits the adjustment of these structural elements for any desired dimension. For instance, two telescoping elements may be adjusted over their length providing the pin hole at either end for attachment, or two of the outer tubes may be provided with a single telescoping inner tube fitted to telescope into both adjoining ends of outer tubes, and further, two clips may be used permitting a greater variation in length and so elements may be pinned or frictionally fixed with the aforementioned spring clip to produce beams or columns of desired length. A variety of gusset plates and structural supporting elements are included to permit various types of constructional details, but throughout all elements the same means of attaching with a pin or affixing with a frictional gripping clip has been carried out to permit many ramifications without departing from the spirit of this invention.

An object of this invention is to provide a plurality of novel telescoping tubular members for constructing toys that appear realistic and may be constructed according to definite dimensions or proportions.

Another object of this invention consists in the provision of novel connecting members in combination with tubular telescoping elements to provide realistic appearing structures as well as means of providing exact dimensional or proportional structures.

A still further object of this invention consists in the provision of various structural elements that may be combined with tubular telescoping elements to provide strong, durable structural replicas of actual bridges, buildings and other such devices.

Other objects may be apparent by reference to the accompanying description and the drawings in which:

Fig. 1 is a cross sectional view of two telescoping elements illustrating a pinned joint, Fig. 2 is a cross sectional view taken on line 2—2 of Fig. 1, Fig. 3 is a plan view of a fastening pin and grommet, Fig. 4 is another embodiment of a fastening pin in which a clip groove is formed, Fig. 5 is a perspective view of an end of one of the tubular members with the pin of Fig. 4 illustrated and held by a spring clip, Fig. 6 is a cross sectional view of the spring clip taken on line 6—6 of Fig 5, Fig. 7 is a cross sectional view of two telescoping tubular members frictionally engaged by the spring clip of Fig. 6, Fig. 8 is a plan view of the spring clip illustrated in Fig. 6, Fig. 9 is a perspective illustration of a gusset plate, Fig. 10 is a perspective illustration of another form of spring clip that may be used with the gusset plate of Fig. 9, Fig. 11 is a perspective illustration of a right angular gusset plate, Fig. 12 is a perspective illustration of a beam supporting bracket, Fig. 13 is a front elevational view of the beam supporting bracket, illustrated in Fig. 12, Fig. 14 is a cross sectional view of a bridge type top gusset plate, and Fig. 15 is a side elevational view of the gusset plate of Fig. 14 mounted on a flat type transverse member and frictionally engaged with a spring clip.

Referring to Figs. 1 and 2 there are illustrated telescoping tubular members 25 and 26 in which the end section of each tubular member is provided with aperatures 27 on the transverse axis of the beams and in which a pin 28 is mounted. The pin 28 is provided with a rubber grommet 29 to frictionally hold said pin in place. This type of joint permits a plurality of telescoping tubular members 25, 26 to be joined and thus provide a beam or member of great length. Referring to Fig. 3, the pin 28 is illustrated separately with the rubber grommet 29. Another embodiment of the pin, 28a is illustrated in Fig. 4, in such case, the pin is provided with a V cut groove 29a about its periphery towards its outer end. In application the pin 28a (as illustrated in Fig. 5) may be inserted through the end of a tubular member 25 and will have a spring clip 30 having a slot 31 on one face thereof pressed into the groove 29 anchoring the pin 28a in position, as illustrated in Fig. 5. The spring clip 30 (as illustrated in Fig. 6) and in its normal position, is flexed from the main axis A—B so that in application the apex C of the flexed portion will provide a gripping stress in the groove 20 of the pin 28a. The spring clip 30 may also be used (as illustrated in Fig. 7) between the tubular members 25 and 26 to frictionally engage the inner surface of tube 25 and the outer surface of tube 26. When fully compressed (as illustrated in Fig. 7) there is considerable frictional bearing between the two tubular members which prevents movement of one tube with respect to the other. It is quite apparent that the tubular members 25 and 26 may be set for a desired relationship and then the spring clip 30 may be pressed into the position illustrated to hold such relationship fixed. The spring clip 30 is further illustrated in Fig. 8 and it may be formed with a pair of shoulders 32, 33 which are approximately at the apex C or slightly behind the apex C (as illustrated in Fig. 6). The clip will be divided into two portions, the wider portion approximating the width of the tubular member 25, while the narrower portion will approximate the width of the tubular member 26. Thus, it is apparent that the spring clip 30 may be forced between the two tubular members until the shoulders 32, 33 abut against the end of the tubular member 25. The spring clip 30 may also be formed with the narrower portion of the clip equal to the width of the tubular member 25, while the wider portion of the clip is equal to the width of a supporting gusset plate (such as that illustrated in Fig. 9). In such application, a tubular member may be fitted into the gusset plate (as illustrated in dotted lines), and the spring clip may be forced into a pair of parallel slots 35, 36 until the shoulders 32, 33 of the clip 30 abut and thus the member 25 would be securely held. Referring to Fig. 9 there is illustrated a gusset plate 38 with an internal width approximately the external width of the member 25 so that in use the members 25 may be securely held by the gusset plate 38. It will be noted that the gusset plate is provided with slots 35, 36 at either end thereof to permit the use of a clip such as illustrated in Fig. 8 or a clip, such as illustrated in Fig. 10, to provide frictional engagement between the walls of the slots 35, 36 and the surface of the member 25. There are provided a plurality of opposed parallel apertures 39, 40, 41, 42 and 43 so that the ends of the various tubular members 25 that may be used with the gusset plate 38 may be pinned thereto (as illustrated in Figs. 1 and 2) with pins 28 or 28a. Thus, in actual use, the members 25 may be securely anchored to the gusset plate and may be spring pressed to give a rigid relationship. Referring to Fig. 10, there is illustrated a clip 30a which is another embodiment of the clip. It will be noted that the clip 30a is formed of a simple flat strip of spring metal flexed sufficiently to take up any clearance between the slots 35, 36 and the surface of a member 25. The clip 30a is provided with two turned up edges 45, 46 to insure maintaining the clip in a central position.

Referring to Fig. 11, there is illustrated a right angular form of gusset plate 48, such as that used about an upright column (illustrated in dotted lines) to support a girder placed at right angles to said upright, said plate being of such form that it encloses the upright (illustrated in dotted lines) on three sides. On the fourth side (of said column) a pair of spring clips (such as that illustrated in Fig. 10) may be inserted in parallel slots 35a and 36a. This will insure a rigid relationship between the upright member (illustrated in dotted lines) and the gusset plate 48. The gusset plate 48 is also provided with two turned over lips 49 and 50 and a pair of apertures 51, so that a girder member 25 (also illustrated in dotted lines) may be secured with a pin 28 passed through the apertures 51 and through the member 25 at its end. To provide a rigid support thereunder, a pair of slots 52 may be provided in the gusset plate 48 in which a spring clip (such as that illustrated in Fig. 10) may be secured, thus wedging the member 25 tightly against the upper lip portions 49 and 50 of the gusset plate 48. The gusset plate 48 may also be provided with parallel opposed apertures 53 and 54, in which event the upright members 25 may be pinned through these apertures, instead of being wedged thereto by a spring clip, or both pins and clips may be used to give absoltue rigidity to the structure. Referring to Fig. 12, there is illustrated a beam supporting bracket 56, which is approximately the width of a tubular member 25 and is three sided in formation, the upper portion going over a member 25 in use and the two side members extending downwardly at least twice the dimension of a tubular member 25, so that a pair of brackets 57 at the lower end of the member 56 will provide supports for a member 25 crossing at right angles to the upper member 25. The brackets 57 are usually positioned a little more than twice the dimension of the member 25 from the top cross piece to allow additional space for a spring clip (such as that illustrated in Fig. 10) to be forced between the bracket edges 58, 59 and the lower face of the element 25. Fig. 13 also illustrates the bracket 56 with the members 25 (shown in dotted lines) in their respective positions and in which the spring clip 30a has been inserted to illustrate the means of holding the elements in their respective positions.

Referring to Figs. 14 and 15, there is illustrated a gusset plate 60 to be used with a flat wide element 61, such as that used as the top curved cord member of a bridge truss. The gusset plate 60 is especially formed to fit the member 61 and is provided with sufficient clearance between the web of the top member of the gusset plate 60 and the flat element 61 to allow a spring clip (such as that illustrated in Fig. 8) to be forced into a frictional engagement to thus fix the relationship between the strip 61 and the gusset plate 60. The gusset plate 60 is also provided with parallel pairs of aperatures 62, 63 and 64 so that upright and diagonal struts of a truss may be affixed to the truss plate by means of pins 28 through these apertures to hold members, such as 25, 26 in their respective relationship.

Although all references throughout the drawings have illustrated a square type tubular telescoping member, the invention shall not be limited to this formation, but rather in some instances, the tubular members may be formed (round or of other shapes) in which there is an outer tubular member and an inner tubular member and in such formation a clip will be formed to follow the contour of the outer periphery of the tube and the inner periphery of the outer tube. The clip will be inserted in the same fashion as already described for the clip 30 and the formation of the clip will be similar to the clip 30, except for its curved formation to fit the tubular members. Thus, it is apparent that various changes and modifications may be made in the shape and formation of the members without departing from the spirit of this invention and this invention shall be limited only by the appended claims.

What is claimed is:

1. In a construction toy including rigid tubular members having transverse perforations through their ends, a flat strip capable of bending into a curved form over its length, a plate slidably fitted over and around said flat strip, said plate having depending sides formed to encompass at least two sides of one or more of said tubular members, said depending sides having perforations therethrough to mate with the perforations in said tubular members for reception of retaining pins, and an unattached flat spring clip inserted between a face of said flat strip and said plate to resiliently bind said plate at any desired place to said flat strip.

2. In a construction toy including rigid telescoping tubular members that telescope freely one within the other, said tubular members having transverse perforations through their ends, a flat strip capable of bending into a curved form over its length, a plate slidably fitted over and around said flat strip, said plate having depending sides formed to encompass at least two sides of one or more of said tubular members, said depending sides having perforations therethrough to mate with the perforations in said tubular members for reception of retaining pins, an unattached flat spring clip adapted to be inserted between any two telescoping members to resiliently bind said tubular members in any desired degree of telescoped relationship, and an unattached flat spring clip adapted to be inserted between a face of said flat strip and said plate to resiliently bind said plate at any desired place to said flat strip.

ROBERT ERNEST MERCIER.

REFERENCES CITED

The following references are of record in the file of this patent:

UNITED STATES PATENTS

| Number | Name | Date |
|---|---|---|
| 1,009,508 | Guthrie | Nov. 21, 1911 |
| 1,066,809 | Gilbert | July 8, 1913 |
| 1,107,075 | Karges | Aug. 11, 1914 |
| 1,380,468 | Drew | June 7, 1921 |
| 1,420,670 | Schuette | June 27, 1922 |
| 1,480,936 | Gonder | Jan. 15, 1924 |
| 1,667,256 | Herrschaft | Apr. 24, 1928 |
| 1,973,536 | Mack | Sept. 11, 1934 |
| 2,063,895 | Mack | Dec. 15, 1936 |
| 2,112,247 | McLoughlin | Mar. 29, 1938 |
| 2,179,415 | Mace | Nov. 7, 1939 |
| 2,354,806 | Fletcher | Aug. 1, 1944 |